United States Patent
Tomioka et al.

(10) Patent No.: US 10,023,141 B2
(45) Date of Patent: Jul. 17, 2018

(54) ENERGY-ABSORBING MEMBER

(71) Applicant: KABUSHIKI KAISHA TOYOTA JIDOSHOKKI, Kariya-shi, Aichi-ken (JP)

(72) Inventors: Hiromasa Tomioka, Kariya (JP); Aya Maki, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 15/507,980

(22) PCT Filed: Aug. 28, 2015

(86) PCT No.: PCT/JP2015/074370
§ 371 (c)(1),
(2) Date: Mar. 1, 2017

(87) PCT Pub. No.: WO2016/035694
PCT Pub. Date: Mar. 10, 2016

(65) Prior Publication Data
US 2017/0282824 A1    Oct. 5, 2017

(30) Foreign Application Priority Data

Sep. 4, 2014    (JP) ................................. 2014-180228

(51) Int. Cl.
*B60R 19/30*    (2006.01)
*B60R 19/34*    (2006.01)
(Continued)

(52) U.S. Cl.
CPC .............. *B60R 19/30* (2013.01); *B60R 19/34* (2013.01); *F16F 7/124* (2013.01); *B60R 19/26* (2013.01); *F16F 7/12* (2013.01)

(58) Field of Classification Search
CPC .. F16F 7/12; F16F 7/124; B60R 19/26; B60R 19/30; B60R 19/34; B32B 5/02
See application file for complete search history.

(56) References Cited

FOREIGN PATENT DOCUMENTS

FR    2909618 A1 *    6/2008    ............. B60R 19/34
JP    55-71840 A    5/1980
(Continued)

OTHER PUBLICATIONS

International Search Report for PCT/JP2015/074370 dated Nov. 2, 2015.
(Continued)

*Primary Examiner* — Melanie Torres Williams
(74) *Attorney, Agent, or Firm* — Sughrue Mion, PLLC

(57) ABSTRACT

An energy-absorbing member includes a fiber structure. The fiber structure includes a first end face configured to first receive a load and a second end face opposite to the first end face in the direction that the load is applied. The fiber structure includes a shape retention section including the first end face, a main section that includes the second end face and hinders propagation of breakage of the fiber structure, and a trigger section that is located between the shape retention section and the main section and serves as a starting point of breakage when receiving an impact load. The shape retention section and the main section each have a woven structure that allows the shape retention section and the main section to have a higher interlayer bonding strength than the trigger section.

5 Claims, 4 Drawing Sheets

(51) Int. Cl.
*F16F 7/12* (2006.01)
*B60R 19/26* (2006.01)

(56) References Cited

FOREIGN PATENT DOCUMENTS

| | | | | |
|---|---|---|---|---|
| JP | 06123323 | A | * | 5/1994 |
| JP | 10-235763 | A | | 9/1998 |
| JP | 2004-324814 | A | | 11/2004 |

OTHER PUBLICATIONS

International Preliminary Report on Patentability with translation of Written Opinion dated Mar. 7, 2017, issued by the International Searching Authority in application No. PCT/JP2015/074370.

* cited by examiner

ENERGY-ABSORBING MEMBER

CROSS REFERENCE TO RELATED APPLICATIONS

This application is a National Stage of International Application No. PCT/JP2015/074370 filed Aug. 28, 2015, claiming priority based on Japanese Patent Application No. 2014-180228 filed Sep. 4, 2014, the contents of all of which are incorporated herein by reference in their entirety.

TECHNICAL FIELD

The present invention relates to an energy-absorbing member that includes a fiber structure impregnated with a plastic and absorbs impact energy when receiving an impact load.

BACKGROUND ART

An energy-absorbing member is placed between a bumper and a car body frame, for example. When receiving an excessive impact load, the energy-absorbing member breaks to absorb the impact energy. A fiber-reinforced composite with excellent energy absorption capacity may be used as an energy-absorbing member. An energy-absorbing member may include a trigger section, which serves as a starting point of breakage when receiving an excessive impact load.

For example, referring to FIG. 5, Patent Document 1 discloses an impact absorption composite structure 80 that includes a fiber lamination impregnated with a plastic. The fiber lamination includes a plurality of laminated reinforcing fibers. The impact absorption composite structure 80 includes a trigger section 82, which extends from one end in the direction in which a load is applied (hereinafter referred to as "load direction") to a predetermined position in the load direction. The trigger section 82 is a section where the interlayer bonding strength of the fiber lamination is not increased. The section of the impact absorption composite structure 80 beyond the predetermined position, that is, the section other than the trigger section 82, is an interlayer reinforcement region 81, in which the interlayer bonding strength is increased by needling 83. When the impact absorption composite structure 80 receives an excessive impact load, localized breakage occurs in the trigger section 82 before the interlayer reinforcement region 81 to absorb the energy, and the interlayer reinforcement region 81 hinders propagation of breakage.

PRIOR ART DOCUMENT

Patent Document

Patent Document 1: Japanese Laid-Open Patent Publication No. 2004-324814

SUMMARY OF THE INVENTION

Problems that the Invention is to Solve

However, when forming the impact absorption composite structure 80 of Patent Document 1, the fiber lamination that is yet to be impregnated with plastic tends to tear from the tip in the load direction or bend in the trigger section 82. Thus, when the fiber lamination is encapsulated in a mold to be impregnated with plastic, for example, the trigger section 82 may tear from the tip or the entire trigger section 82 may bend as shown in FIG. 5. This may significantly hinder the handling of the fiber lamination, reducing the productivity of the impact absorption composite structure 80.

It is an objective of the present invention to provide an energy-absorbing member that limits reduction in productivity.

Means for Solving the Problems

To achieve the foregoing objective and in accordance with one aspect of the present invention, an energy-absorbing member configured to absorb impact energy when receiving an impact load is provided. The energy-absorbing member includes a fiber structure impregnated with a plastic. The fiber structure includes a plurality of fiber layers that is laminated in a direction perpendicular to a direction in which a load is applied. Each fiber layer includes an arrangement of a plurality of load direction yarns extending in the direction in which a load is applied. The fiber structure has interlayer bonding strength resulting from bonding of the plurality of fiber layers. The fiber structure includes a first end face, which is configured to first receive a load, and a second end face, which is opposite to the first end face in the direction in which a load is applied. The fiber structure includes a shape retention section including the first end face, a main section that includes the second end face and hinders propagation of breakage of the fiber structure, and a trigger section that is located between the shape retention section and the main section and serves as a starting point of breakage when receiving an impact load. The shape retention section and the main section each have a woven structure that allows the shape retention section and the main section to have a higher interlayer bonding strength than the trigger section.

MODES FOR CARRYING OUT THE INVENTION

First Embodiment

An energy-absorbing member according to a first embodiment of the present invention will now be described with reference to FIGS. 1A-1C.

Figure 1A:
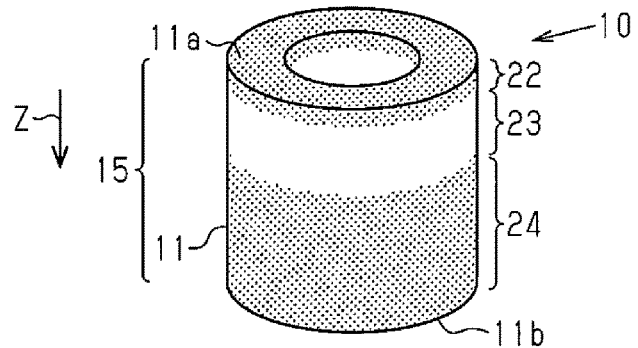
FIG. 1A is a perspective view showing an energy-absorbing member of a first embodiment.

Referring to FIG. 1A, an energy-absorbing member 10 is a fiber-reinforced composite. The energy-absorbing member 10 is formed by impregnating a tubular fiber structure 11 with a thermosetting plastic 15, which is a matrix plastic. In other words, the energy-absorbing member 10 includes the fiber structure 11 that is impregnated with the thermosetting plastic 15. When receiving an excessive impact load in the axial direction of the tubular shape, the energy-absorbing member 10 breaks to absorb the energy. Hereinafter, the direction in which a load is applied to the energy-absorbing member 10 (the axial direction of the tubular shape) is referred to as a load direction Z. The thermosetting plastic 15 may be an epoxy plastic, for example.

The fiber structure 11 includes two end faces on opposite sides in the load direction Z. More specifically, the fiber structure 11 includes a first end face 11a, which is configured to first receive a load, and a second end face 11b, which is opposite to the first end face 11a in the load direction Z.

The fiber structure 11 includes a shape retention section 22, which includes the first end face 11a, a main section 24, which includes the second end face 11b and hinders propagation of breakage of the fiber structure 11, and a trigger section 23, which is located between the shape retention section 22 and the main section 24 and serves as a starting point of breakage when receiving an impact load. The fiber structure 11 is configured to receive a load in the shape retention section 22, the trigger section 23, and the main section 24 in this order.

The trigger section 23 is thus located between other sections in the load direction Z. The trigger section 23 is closer to the first end face 11a than to the second end face 11b in the load direction Z. In other words, when the middle position of the fiber structure 11 is defined between the first end face 11a and the second end face 11b in the load direction Z, the trigger section 23 is located between the first end face 11a and the middle position.

The main section 24 is closer to the second end face 11b than the trigger section 23 in the load direction Z. The shape retention section 22 is closer to the first end face 11a than the trigger section 23 in the load direction Z.

The trigger section 23 is located between the shape retention section 22 and the main section 24 in the load direction Z. In the load direction Z, the main section 24 is the longest, and the trigger section 23 is the second longest. The shape retention section 22 is the shortest in the load direction Z.

Figure 1B:
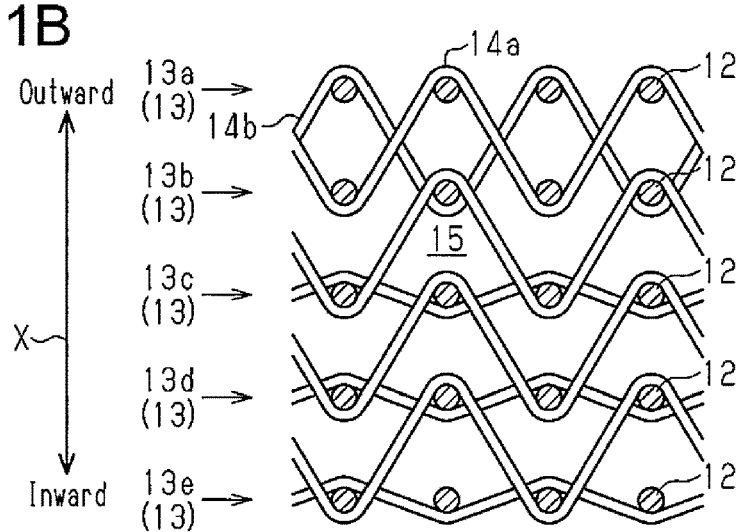
FIG. 1B is a cross-sectional plan view showing a shape retention section and a main section.

As shown in FIG. 1B, the fiber structure 11 includes a plurality of fiber layers 13, which is laminated in a direction (lamination direction X) perpendicular to the load direction Z. Each fiber layer 13 is formed by arranging a plurality of load direction yarns 12 extending over the entire length in the load direction Z. In the tubular fiber structure 11, the fiber layers 13 are layered concentrically about the central axis extending in the load direction Z. In the present embodiment, the fiber structure 11 has five fiber layers 13 including a first fiber layer 13a, a second fiber layer 13b, a third fiber layer 13c, a fourth fiber layer 13d, and a fifth fiber layer 13e, which are arranged in the lamination direction X, or the radial direction. Specifically, the fiber layer 13 at one end in the lamination direction X, which is the outer end, is the first fiber layer 13a, and the second fiber layer 13b, third fiber layer 13c, fourth fiber layer 13d, and fifth fiber layer 13e are arranged inside the first fiber layer 13a in order toward the other end in the lamination direction X, which is the inner end.

In the shape retention section 22 and the main section 24, two fiber layers 13 that are adjacent to each other in the lamination direction X are bonded to each other by interlacing yarns including a first interlacing yarn 14a and a second interlacing yarn 14b. That is, the first and second fiber layers 13a and 13b are bonded to each other, the second and third fiber layers 13b and 13c are bonded to each other, the third and fourth fiber layers 13c and 13d are bonded to each other, and the fourth and fifth fiber layers 13d and 13e are bonded to each other. The fiber structure 11 has interlayer bonding strength resulting from bonding of the plurality of fiber layers 13.

The first and second interlacing yarns 14a and 14b are extended through two fiber layers 13 that are adjacent to each other in the lamination direction X and folded back on load direction yarns 12 of the fiber layers 13. When the first and second interlacing yarns 14a and 14b extend in one direction, the first interlacing yarn 14a is folded back on one of two load direction yarns 12 that are adjacent to each other in the lamination direction X, while the second interlacing yarn 14b is folded back on the other load direction yarn 12. Thus, the first interlacing yarn 14a and second interlacing yarn 14b are interlaced with the two load direction yarns 12 that are adjacent to each other in the lamination direction X so as to sandwich the load direction yarns 12 from opposite directions.

In the shape retention section 22 and the main section 24, the interlacing between the first and second interlacing yarns 14a and 14b and the load direction yarns 12 bonds fiber layers 13 that are adjacent to each other in the lamination direction X, thereby reinforcing the interlayer bonding strength in the lamination direction X of the five fiber layers 13. The main section 24 is identical to the shape retention section 22 in structure and interlayer bonding strength. The woven structure allows the main section 24 and the shape retention section 22 to have a higher interlayer bonding strength than the trigger section 23. The shape retention section 22 includes only one layer of interlacing yarns 14a and 14b at the first end face 11a in the load direction Z. In contrast, the main section 24 includes a plurality of layers of interlacing yarns 14a and 14b, which is layered in the load direction Z.

Figure 1C:
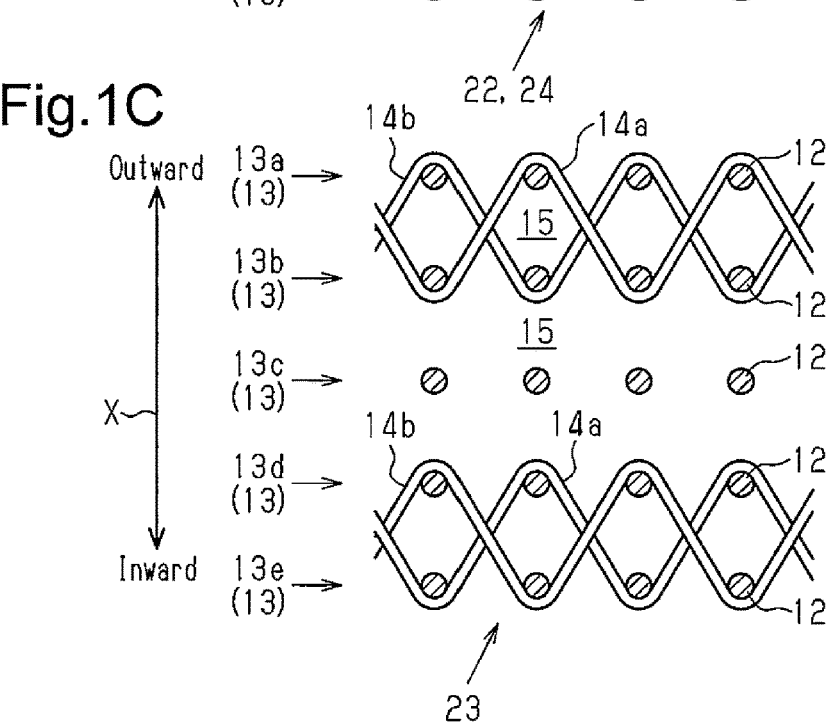
FIG. 1C is a cross-sectional plan view showing a trigger section.

As shown in FIG. 1C, the trigger section 23 includes the five fiber layers 13, which are the same as those of the shape retention section 22 and the main section 24, and first and second interlacing yarns 14a and 14b. However, the trigger section 23 has a lower interlayer bonding strength than the shape retention section 22 and the main section 24. In the trigger section 23, the first and second fiber layers 13a and 13b, which are adjacent to each other in the lamination direction X, are bonded to each other by the first and second interlacing yarns 14a and 14b, and the fourth and fifth fiber layers 13d and 13e are bonded to each other by the first and second interlacing yarns 14a and 14b.

However, in the trigger section 23, the first and second interlacing yarns 14a and 14b are not interlaced with load direction yarns 12 in a manner that bonds the third fiber layer 13c to the second fiber layer 13b or the fourth fiber layer 13d. In other words, the load direction yarns 12 in the third fiber layer 13c are not interlaced with the first interlacing yarn 14a or the second interlacing yarn 14b, such that the trigger section 23 includes a section in which the fiber layers 13 are not bonded together in the lamination direction. That is, of the five fiber layers 13, the interlayer bonding strength is increased only for the two layers at each end in the lamination direction X.

The trigger section 23 thus has a lower interlayer bonding strength than the shape retention section 22 and the main section 24, in which each of the five fiber layers 13 is bonded to adjacent fiber layers 13 with an increased interlayer bonding strength. In the shape retention section 22 of the fiber structure 11, the fiber layers 13 are bonded by the first and second interlacing yarns 14a and 14b. This woven structure allows the shape retention section 22 to have a higher interlayer bonding strength than the trigger section 23.

The load direction yarns 12 and the first and second interlacing yarns 14a and 14b are non-twisted fiber bundles of the same type of material. In the present embodiment, the load direction yarns 12 and the interlacing yarns 14a and 14b are non-twisted fiber bundles made of carbon fibers. Each carbon fiber bundle is formed by binding hundreds to tens of thousands of fine fibers. The number of the fibers in each fiber bundle may be selected according to the required performance.

When the energy-absorbing member 10, which has the fiber structure 11 including the shape retention section 22, the trigger section 23, and the main section 24 as reinforcing fibers, receives an excessive impact load on the first end face 11a in the load direction Z, localized breakage occurs in the trigger section 23 and absorbs the energy. The main section 24 then hinders propagation of breakage.

A method for manufacturing the energy-absorbing member 10 and its operation are now described.

First, the fiber structure 11 including the shape retention section 22, the trigger section 23, and the main section 24 is manufactured. Then, the fiber structure 11 is impregnated with a thermosetting plastic 15, which then hardens. The impregnation and hardening of the plastic 15 are performed by resin transfer molding (RTM). Specifically, the fiber structure 11 is enclosed in a mold having protrusions and recesses, and the thermosetting plastic 15 is introduced into the mold. The energy-absorbing member 10 is formed when the thermosetting plastic 15 hardens.

The above described embodiment has the following advantages.

(1) The energy-absorbing member 10 includes the trigger section 23 and the shape retention section 22, which is closer to the first end face 11a of the fiber structure 11 than the trigger section 23. The shape retention section 22 is located in the position that first receives a load. The shape retention section 22 is formed by bonding fiber layers 13 that are adjacent to each other in the lamination direction X with the first and second interlacing yarns 14a and 14b and thus resist fraying. As such, when encapsulating the fiber structure 11 in a mold to manufacture the energy-absorbing member 10, the shape retention section 22 reduces the likelihood of the fiber layers 13 tearing apart in the first end face 11a of the fiber structure 11 or bending. This facilitates handling of the fiber structure 11 when encapsulating the fiber structure 11 in the mold, such that the productivity of the energy-absorbing member 10 is not decreased.

(2) The shape retention section 22 of the fiber structure 11 limits tearing or bending of the first end face 11a of the fiber structure 11 compared to the trigger section 23. This reduces the likelihood of the load direction yarns 12 in the trigger section 23 arranged unevenly in the lamination direction X and the arrangement direction of the load direction yarns 12. As a result, the manufactured energy-absorbing member 10 is less likely to have uneven load direction yarns 12 or irregular plastic density, which would otherwise occur if the load direction yarns 12 are arranged unevenly.

(3) The shape retention section 22 includes only one layer at the first end face 11a. That is, the shape retention section 22 occupies the smallest area that is formed by the first and second interlacing yarns 14a and 14b. Thus, the shape retention section 22 maintains the shape of the fiber structure 11 without excessively increasing the interlayer bonding strength in the first end face 11a of the fiber structure 11.

(4) The fiber structure 11 has different woven structures such that the trigger section 23 differs from the shape retention section 22 and the main section 24 in function. This facilitates manufacturing of the fiber structure 11 compared to situations in which a fiber structure is first formed with a uniform woven structure and then a shape retention section is formed by applying an adhesive to one end of the fiber structure in the load direction Z, or a trigger section and shape retention section are formed by reducing the thickness of the fiber structure.

(5) The shape retention section 22 and the main section 24 are identical in woven structure and interlayer bonding strength. This facilitates manufacturing of the fiber structure 11 and thus the energy-absorbing member 10 compared to a structure in which the shape retention section 22, the trigger section 23, and the main section 24 differ from one another in woven structure.

Second Embodiment

Figure 2A:
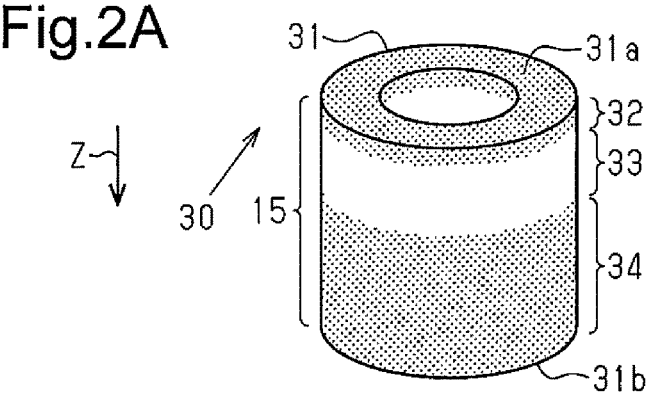
FIG. 2A is a perspective view showing an energy-absorbing member of a second embodiment.
Figure 2B:
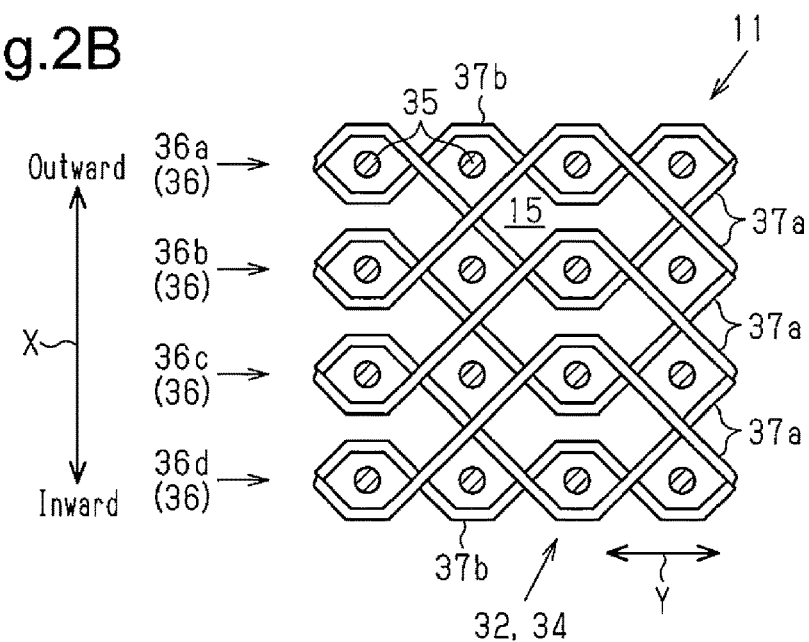
FIG. 2B is a cross-sectional plan view showing a shape retention section and a main section.
Figure 2C:
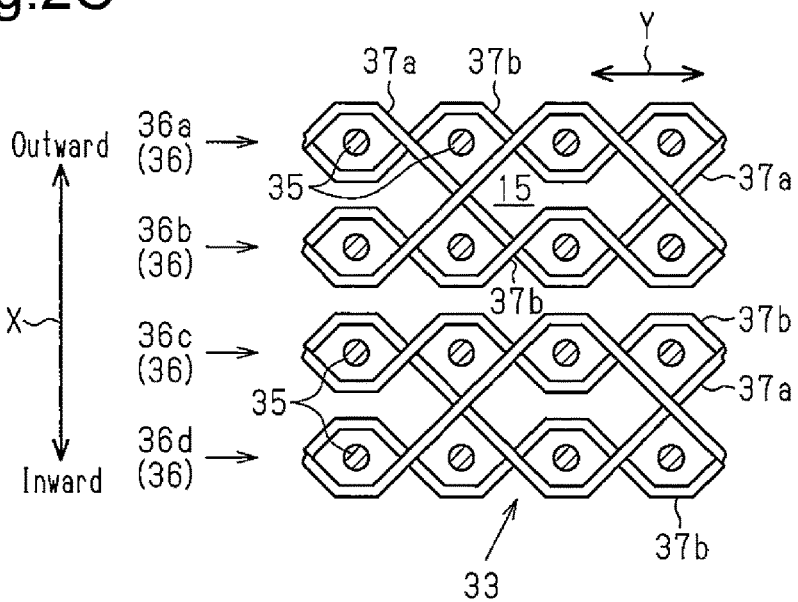
FIG. 2C is a cross-sectional plan view showing a trigger section.

Referring to FIGS. 2A-2C, a second embodiment of an energy-absorbing member will now be described. The components of the second embodiment that are the same as the corresponding components of the first embodiment will not be described in detail.

As shown in FIG. 2A, an energy-absorbing member 30 of the second embodiment includes a tubular fiber structure 31 in a similar manner as the energy-absorbing member 10 of the first embodiment. The fiber structure 31 includes a shape retention section 32, a trigger section 33, and a main section 34, which are arranged along the load direction Z. The fiber structure 31 of the second embodiment differs from the first embodiment in the method for increasing the interlayer bonding strength of the shape retention section 32 and the main section 34. The fiber structure 31 is formed using a three-dimensional braiding apparatus. The fiber structure 31 includes a first end face 31a, which is configured to first receive a load in the load direction Z, and a second end face 31b, which is opposite to the first end face 31a in the load direction Z.

As shown in FIG. 2B, the fiber structure 31 is of a braided structure. The shape retention section 32 and the main section 34 each include a plurality of fiber layers 36 and first and second through-yarns 37a and 37b extending through fiber layers 36. Each fiber layer 36 is formed by arranging a plurality of load direction yarns 35. The load direction yarns 35 and the first and second through-yarns 37a and 37b are non-twisted fiber bundles made of carbon fibers. In each fiber layer 36, the direction that is perpendicular to the lamination direction X and in which the load direction yarns 35 are arranged is defined as an arrangement direction Y.

The fiber structure 31 has four fiber layers 36 including a first fiber layer 36a, a second fiber layer 36b, a third fiber layer 36c, and a fourth fiber layer 36d, which are arranged in the lamination direction X, or the radial direction. Specifically, the fiber layer 36 at one end in the lamination direction X, which is the outer end, is the first fiber layer 36a, and the second fiber layer 36b, third fiber layer 36c, and fourth fiber layer 36d are arranged inside the first fiber layer 36a in order toward the other end in the lamination direction X, which is the inner end. In the shape retention section 32 and the main section 34 of the fiber structure 31, each first through-yarn 37a extends through corresponding two fiber layers 36 that are adjacent to each other in the lamination direction X and is folded back on the load direction yarns 35 of these fiber layers 36. That is, two first through-yarns 37a are extended through the first and second fiber layers 36a and 36b and folded back on load direction yarns 35 of the first and second fiber layers 36a and 36b. Other two first through-yarns 37a are extended through the second and third fiber layers 36b and 36c and folded back on load direction yarns 35 of the second and third fiber layers 36b and 36c. Other two first through-yarns 37a are extended through the third and fourth fiber layers 36c and 36d and folded back on load direction yarns 35 of the third and fourth fiber layers 36c and 36d.

More specifically, with respect to two adjacent fiber layers 36, a first through-yarn 37a is folded back on a load direction yarn 35 of one of the fiber layers 36 and then, skipping the next load direction yarn 35 of the other fiber layer 36 in the arrangement direction Y, extends toward the load direction yarn 35 that follows the next load direction yarn 35. After extending through the two fiber layers 36, the first through-yarn 37a is folded back on the load direction yarn 35 of the other fiber layer 36. Thus, the first through-yarn 37a is folded back on load direction yarns 35 that are in different positions in the arrangement direction Y so as to hold the load direction yarns 35 from opposite directions, thereby holding the two fiber layers 36 that are adjacent to each other in the lamination direction X from opposite directions. The first through-yarn 37a thus bonds the two adjacent fiber layers 36.

Each second through-yarn 37b is extended through and folded back on only the corresponding one of the first fiber layer 36a, which is located at one end in the lamination direction, and the fourth fiber layer 33d, which is located at the other end in the lamination direction. The first and second through-yarns 37a and 37b sandwich load direction yarns 35 of fiber layers 36, thereby reinforcing the interlayer bonding strength between fiber layers 36 adjacent to each other in the lamination direction X. The main section 34 is identical to the shape retention section 32 in structure and interlayer bonding strength. The shape retention section 32 includes only one layer at the first end face 31a in the load direction Z.

As shown in FIG. 2C, in the trigger sections 33, a second through-yarn 37b is extended through and folded back on each of the four fiber layers 36. First through-yarns 37a are extended through the first and second fiber layers 36a and 36b and folded back on the load direction yarns 35 of these fiber layers 36. Other first through-yarns 37a are extended through the third and fourth fiber layers 36c and 36d and folded back on the load direction yarns 35 of these fiber layers 36.

As such, the trigger section 33 does not include a first through-yarn 37a that extends through the second and third fiber layers 36b and 33c, such that the second fiber layer 36b is not bonded to the third fiber layer 36c by a first through-yarn 37a. In other words, the trigger section 33 includes a section in which fiber layers 36 are not bonded together in the lamination direction due to lack of a first through-yarn 37a providing bonding in the lamination direction. Thus, of the four fiber layers 36 in the trigger section 33, only two layers at each end in the lamination direction X have an increased interlayer bonding strength.

This results in the trigger section 33 having a lower interlayer bonding strength than the shape retention section 32 and the main section 34, in which each of the four fiber layers 36 is bonded to adjacent fiber layers 36. In the shape retention section 32 and the main section 34 of the fiber structure 31, the fiber layers 36 are bonded by the first and second through-yarns 37a and 37b. This woven structure allows the shape retention section 32 and the main section 34 to have a higher interlayer bonding strength than the trigger section 33.

The energy-absorbing member 30 of the present embodiment is manufactured by impregnating the fiber structure 31, which is formed using a three-dimensional braiding apparatus, with the thermosetting plastic 15 and hardening the thermosetting plastic 15. The impregnation and hardening of the plastic is performed by the resin transfer molding (RTM).

In addition to the advantages of the first embodiment, the second embodiment provides the following advantage.

(6) The fiber structure 31 of the energy-absorbing member 30 of the second embodiment is formed using a three-dimensional braiding apparatus. This facilitates manufacturing of the tubular energy-absorbing member 30.

Third Embodiment

Figure 3A:
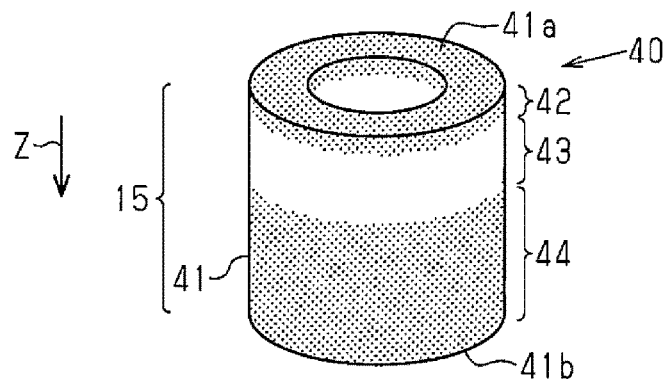
FIG. 3A is a perspective view showing an energy-absorbing member of a third embodiment.
Figure 3B:
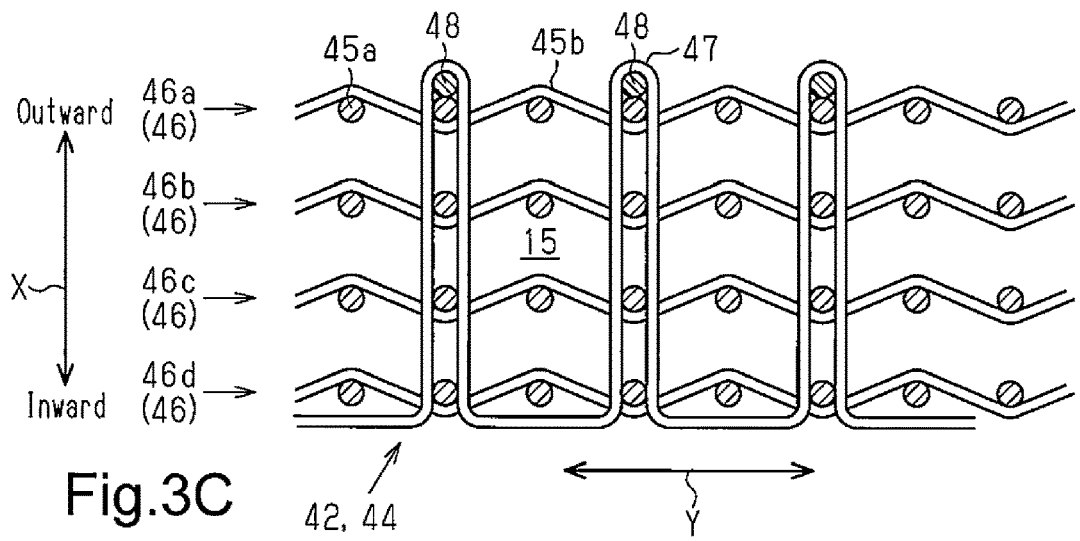
FIG. 3B is a cross-sectional plan view showing a shape retention section and a main section.
Figure 3C:
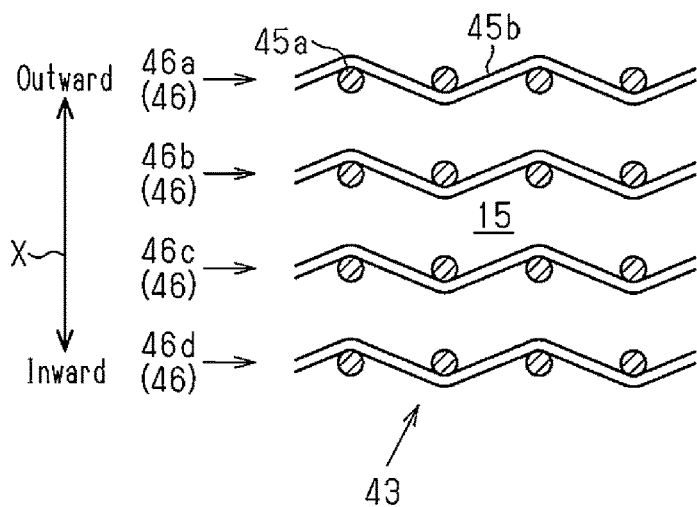
FIG. 3C is a cross-sectional plan view showing a trigger section.

Referring to FIGS. 3A-3C, a third embodiment of an energy-absorbing member will now be described. The components of the third embodiment that are the same as the corresponding components of the first embodiment will not be described in detail.

As shown in FIG. 3A, an energy-absorbing member 40 of the third embodiment includes a tubular fiber structure 41 in a similar manner as the energy-absorbing member 10 of the first embodiment. The fiber structure 41 includes a shape retention section 42, a trigger section 43, and a main section 44, which are arranged along the load direction Z. The fiber structure 41 includes a first end face 41a, which is configured to first receive a load, and a second end face 41b, which is opposite to the first end face 41a in the load direction Z.

As shown in FIG. 3B, the fiber structure 41 of the third embodiment includes a lamination of a plurality of fiber layers 46. Each fiber layer 46 is a plain weave (fabric) in which each of warp yarns 45a, which are load direction yarns, and weft yarns 45b is woven to alternate one by one. Although the fiber layer 46 of the present embodiment is a plain weave, the fiber layer 46 may be a satin or twill fabric.

In each fiber layer 46, the direction that is perpendicular to the lamination direction X and in which the warp yarn 45a are arranged is defined as an arrangement direction Y. The fiber structure 41 has four fiber layers 46 including a first fiber layer 46a, a second fiber layer 46b, a third fiber layer 46c, and a fourth fiber layer 46d, which are arranged in the lamination direction X, or the radial direction. Specifically, the fiber layer 46 at one end in the lamination direction X, which is the outer end, is the first fiber layer 46a, and the second fiber layer 46b, third fiber layer 46c, and fourth fiber layer 46d are arranged inside the first fiber layer 46a in this order toward the other end in the lamination direction X, which is the inner end.

In the shape retention section 42 and the main section 44 of the fiber structure 41, the fiber layers 46 are bonded by a plurality of in-plane yarns 47 and retention yarns 48. The in-plane yarns 47 and retention yarns 48, as well as the warp yarns 45a and weft yarns 45b, are non-twisted fiber bundles made of carbon fibers.

The retention yarns 48 are arranged on the surface of the first fiber layer 46a at one end in the lamination direction and at intervals in the arrangement direction Y of the warp yarns 45a. Each in-plane yarn 47 is inserted into the lamination of the four fiber layers 46 from the surface of the fourth fiber layer 46d at the other end in the lamination direction, extended through the four fiber layers 46 in the lamination direction X, and then folded back on the outer side of a retention yarn 48 on the surface of the first fiber layer 46a. Then, the in-plane yarn 47 is inserted into the lamination of the four fiber layers 46 from the surface of the first fiber layer 46a, extended through the four fiber layers 46 in the lamination direction X, and then drawn out of the surface of the fourth fiber layer 46d. The in-plane yarn 47 is repeatedly folded back on the surfaces of the first fiber layer 46a and the fourth fiber layer 43d, thereby bonding the four fiber layers 46 in a plurality of positions.

As shown in FIG. 3C, the trigger section 43 of the fiber structure 41 is formed only by layering the fiber layers 46, and the fiber layers 46 are not bonded together by an in-plane yarn 47 or a retention yarn 48. The trigger section 43 has a lower interlayer bonding strength than the shape retention section 42 and the main section 44 accordingly. That is, the woven structure allows the shape retention section 42 and the main section 44 to have a higher interlayer bonding strength than the trigger section 43.

In addition to the advantages of the first embodiment, the third embodiment provides the following advantage.

(7) In the shape retention section 42 and the main section 44 in the energy-absorbing member 40 of the third embodiment, the fiber layers 46 are bonded together by in-plane yarns 47 and retention yarns 48, whereas the fiber layers 46 in the trigger section 43 are not bonded together by an in-plane yarn 47 or a retention yarn 48. Thus, the fiber structure 41 is manufactured by bonding the four fiber layers 46 with in-plane yarns 47 and retention yarns 48 only in the shape retention section 42 and the main section 44. This facilitates manufacturing of the fiber structure 41 including the shape retention section 42, the trigger section 43, and the main section 44.

The above illustrated embodiments may be modified as follows.

All of the fiber layers in the trigger sections 23 and 33 of the first and second embodiments may be bonded in the lamination direction X by first and second interlacing yarns 14a and 14b or first and second through-yarns 37a and 37b. In this case, the number of interlacing points of the first and second interlacing yarns 14a and 14b in the trigger section 23 and the number of penetration points of the first and second through-yarns 37a and 37b in the trigger section 33 may be less than those in the shape retention section and the main section so that each trigger section has a lower interlayer bonding strength than the shape retention section and the main section.

Alternatively, the first and second interlacing yarns 14a and 14b in the trigger section 23 and the first and second through-yarns 37a and 37b in the trigger section 33 may be thinner than those in the shape retention section and the main section so that each trigger section has a lower interlayer bonding strength than the shape retention section and the main section.

Figure 4:
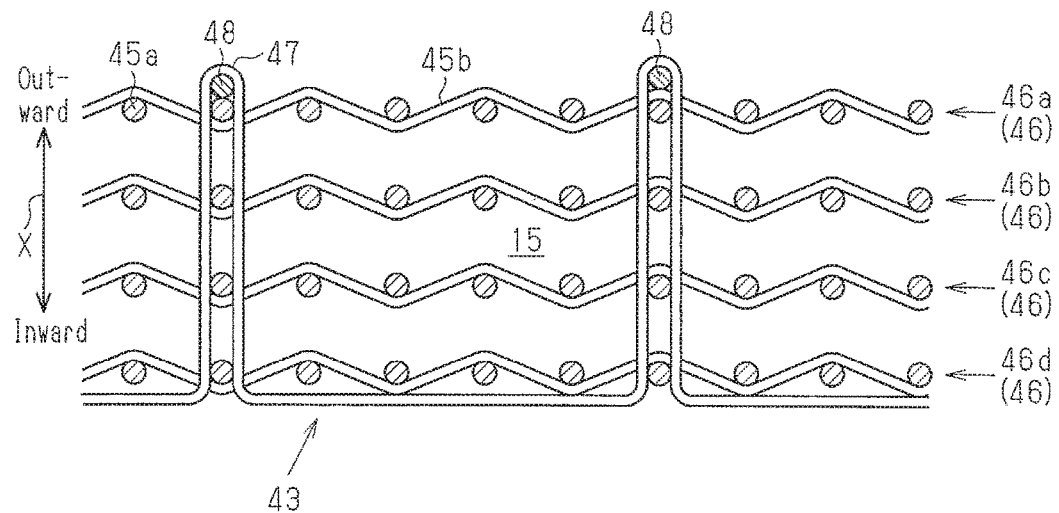
FIG. 4 is a cross-sectional plan view showing a modification of the trigger section of the third embodiment.
Figure 5:
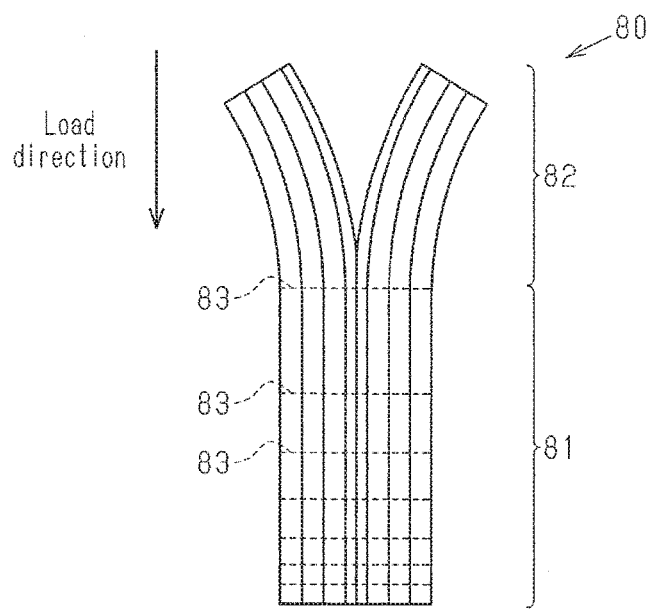
FIG. 5 is a diagram showing the background art.

The trigger section 43 of the third embodiment may include in-plane yarns 47 and retention yarns 48. In this case, as shown in FIG. 4, the number of in-plane yarns 47 and retention yarns 48 used in the trigger section 43 may be less than those in the shape retention section 42 and the main section 44 so that the trigger section 43 have a lower interlayer bonding strength than the shape retention section 42 and the main section 44.

Alternatively, when using in-plane yarns 47 and retention yarns 48 in the trigger section 43, the in-plane yarns 47 in the trigger section 43 may be thinner than those in the shape retention section 42 and the main section 44 (this structure is not shown). The difference in thickness allows the trigger section 43 to have a lower interlayer bonding strength than the shape retention section 42 and the main section 44 even when the number of in-plane yarns 47 and retention yarns 48 used in the trigger section 43 is equal to the number of those in the shape retention section 42 and the main section 44.

In the shape retention section 32 of the second embodiment, the method for bonding the fiber layers 36 with the first and second through-yarns 37a and 37b may be modified as appropriate. Instead of using two types of through-yarns of first and second through-yarns 37a and 37b, only one type of through-yarn may be used to bond the fiber layers 36 together.

In the shape retention section 22 of the first embodiment, the first and second interlacing yarns 14a and 14b may be interlaced with three or more fiber layers 13. In this case, three or more load direction yarns 12 that are adjacent in the lamination direction X are sandwiched.

In the embodiments, provided that the shape retention section 22, 32, 42 has a higher interlayer bonding strength than the trigger section 23, 33, 43, the shape retention section 22, 32, 42 may have a lower or higher interlayer bonding strength than the main section 24, 34, 44.

In the embodiments, provided that the shape retention section 22, 32, 42 has a higher interlayer bonding strength than the trigger section 23, 33, 43, the shape retention section 22, 32, 42 may differ from the main section 24, 34, 44 in woven structure.

In the embodiments, the matrix plastic is a thermosetting plastic 15. However, other types of plastic may be used.

In the embodiments, the number of fiber layers 13, 36, 46 in lamination may be changed.

The fibers that form the load direction yarns 12 and 35, first and second interlacing yarns 14a and 14b, first and second through-yarns 37a and 37b, warp yarns 45a, weft yarns 45b, in-plane yarns 47, and retention yarns 48 are not limited to carbon fibers. The fibers may be changed according to the characteristics required for the energy-absorbing member 10, 30, 40, for example. Fibers that may be used include aramid fibers, poly-p-phenylenebenzobisoxazole fibers, ultrahigh molecular weight polyethylene fibers, glass fibers, and ceramic fibers.

Instead of having a tubular shape, the fiber structure 11, 31, 41 may be shaped as cylinder or plate in which load direction yarns extend in the load direction Z.

The invention claimed is:

1. An energy-absorbing member configured to absorb impact energy when receiving an impact load, the energy-absorbing member comprising a fiber structure impregnated with a plastic, wherein
the fiber structure includes a plurality of fiber layers that is laminated in a direction perpendicular to a direction in which a load is applied,
each fiber layer includes an arrangement of a plurality of load direction yarns extending in the direction in which a load is applied,
the fiber structure has interlayer bonding strength resulting from bonding of the plurality of fiber layers,
the fiber structure includes
a first end face, which is configured to first receive a load, and
a second end face, which is opposite to the first end face in the direction in which a load is applied,
the fiber structure includes
a shape retention section including the first end face,
a main section that includes the second end face and hinders propagation of breakage of the fiber structure, and a trigger section that is located between the shape retention section and the main section and serves as a starting point of breakage when receiving an impact load, and the shape retention section and the main section each have a woven structure that allows the shape retention section and the main section to have a higher interlayer bonding strength than the trigger section.

2. The energy-absorbing member according to claim 1, wherein in the shape retention section, two fiber layers adjacent to each other in a lamination direction are bonded to each other by an interlacing yarn sandwiching corresponding ones of the load direction yarns, and the trigger section includes a section in which the fiber layers are not bonded together in the lamination direction by the interlacing yarn.

3. The energy-absorbing member according to claim 1, wherein the shape retention section is of a braided structure and includes through-yarns, which are arranged in a direction intersecting the load direction yarns and extend through corresponding ones of the fiber layers, the through-yarns bond the corresponding ones of the fiber layers that are adjacent to each other in a lamination direction to each other, and the trigger section includes a section in which the fiber layers are not bonded together in the lamination direction by the through-yarns.

4. The energy-absorbing member according to claim 1, wherein each fiber layer is a fabric, in the shape retention section, the shape retention section includes retention yarns, which are arranged on a surface of one of the fiber layers that is at one end in a lamination direction, and an in-plane yarn, which is extended through the laminated fiber layers in the lamination direction and folded back on outer sides of the retention yarns, the retention yarns and the in-plane yarn bond the fiber layers together, and the fiber layers in the trigger section are not bonded together by the in-plane yarn or the retention yarns.

5. The energy-absorbing member according to claim 1, wherein the plastic is a thermosetting plastic.

* * * * *